(12) United States Patent
Brouillette et al.

(10) Patent No.: US 9,794,150 B2
(45) Date of Patent: *Oct. 17, 2017

(54) APPARATUS AND METHOD FOR CONTENT PLAYBACK UTILIZING CROWD SOURCED STATISTICS

(71) Applicant: Roku, Inc., Los Gatos, CA (US)

(72) Inventors: Pat Brouillette, Tempe, AZ (US); Frank Maker, Livermore, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,348

(22) Filed: Feb. 22, 2016

(65) Prior Publication Data

US 2016/0248651 A1    Aug. 25, 2016

Related U.S. Application Data

(63) Continuation of application No. 14/552,202, filed on Nov. 24, 2014, now Pat. No. 9,270,563.

(51) Int. Cl.
*G06F 15/177* (2006.01)
*H04L 12/26* (2006.01)
*H04L 29/08* (2006.01)

(52) U.S. Cl.
CPC .......... *H04L 43/0876* (2013.01); *H04L 67/22* (2013.01); *H04L 67/32* (2013.01); *H04L 67/34* (2013.01)

(58) Field of Classification Search
CPC .... G11B 27/005; H04R 5/02; H04N 21/2662; H04L 43/0876; H04L 67/32; H04L 67/34; H04L 67/22

USPC ........................................ 709/203, 221, 232
See application file for complete search history.

(56) References Cited

U.S. PATENT DOCUMENTS

| | | | |
|---|---|---|---|
| 5,926,624 A * | 7/1999 | Katz .................. | G06Q 20/1235 707/999.104 |
| 7,197,557 B1 * | 3/2007 | Asar .................... | H04L 41/5009 707/999.103 |
| 7,698,451 B2 * | 4/2010 | Ganesan ............ | H04N 7/17336 709/231 |
| 2005/0145099 A1 | 7/2005 | Lengeling et al. | |
| 2006/0218220 A1 * | 9/2006 | Ganesan ............ | H04N 7/17318 709/200 |
| 2007/0061853 A1 | 3/2007 | Kondo et al. | |
| 2007/0094583 A1 | 4/2007 | Randall et al. | |

(Continued)

OTHER PUBLICATIONS

International Search Report and Written Opinion of the International Searching Authority for International Application No. PCT/US2015/060987, mailed Feb. 26, 2016.

*Primary Examiner* — Phuoc Nguyen
(74) *Attorney, Agent, or Firm* — Sterne, Kessler, Goldstein and Fox P.L.L.C.

(57) ABSTRACT

A server includes a processor and a memory connected to the processor to store instructions executed by the processor to collect playback statistics from network connected content players, perform an evaluation of the playback statistics, and establish a playback configuration for specified content based upon the evaluation of the playback statistics. A request for the playback configuration for the specified content is received from a network connected content player. The playback configuration for the specified content is transferred to the network connected player.

20 Claims, 4 Drawing Sheets

(56) References Cited

U.S. PATENT DOCUMENTS

| | | |
|---|---|---|
| 2009/0274437 A1 | 11/2009 | Stiers et al. |
| 2010/0114816 A1 | 5/2010 | Kiilerich |
| 2010/0142915 A1 | 6/2010 | McDermott et al. |
| 2010/0329638 A1 | 12/2010 | Soukup et al. |
| 2012/0131125 A1* | 5/2012 | Seidel ................ H04N 5/76 709/212 |
| 2012/0251082 A1 | 10/2012 | De Vos et al. |
| 2012/0311043 A1* | 12/2012 | Chen ............ H04N 21/23406 709/204 |
| 2012/0311094 A1* | 12/2012 | Biderman ............ H04N 5/783 709/219 |
| 2013/0279878 A1 | 10/2013 | Haverkamp Begemann |
| 2013/0343566 A1 | 12/2013 | Triplett et al. |
| 2014/0108622 A1 | 4/2014 | Guo |
| 2014/0321831 A1 | 10/2014 | Olsen et al. |
| 2015/0100702 A1* | 4/2015 | Krishna .......... H04N 21/23439 709/231 |

* cited by examiner ated with an embodiment of the invention.

APPARATUS AND METHOD FOR CONTENT PLAYBACK UTILIZING CROWD SOURCED STATISTICS

CROSS REFERENCE TO RELATED APPLICATIONS

This patent application is a continuation of U.S. patent application Ser. No. 14/552,202, filed Nov. 24, 2014, which is incorporated by reference herein in its entirety.

FIELD OF THE INVENTION

This invention relates to content distribution and playback in a networked environment. More particularly, this invention relates to content playback techniques utilizing crowd sourced statistics.

BACKGROUND OF THE INVENTION

When viewing on-demand media (e.g., video, audio, games, etc.) on a device (e.g., a streaming media player, a game console, etc.) the playback parameters are specified. International digital standards exist for playback devices to play all content in a uniform manner, but they are not uniformly applied. For example, in the case of audio a volume level may be specified when mastered content is formed. After distribution of the mastered content to various content providers, such content providers may specify distinct audio volume levels. Thus, a single version of mastered content may be delivered by different content providers with different audio parameters. Alternately, or in addition, the content provider does not deliver all content with uniform audio parameters. Consequently, there are non-uniform user experiences as the mastered content is consumed.

In view of the foregoing, it would be desirable to improve user experiences during content playback.

SUMMARY OF THE INVENTION

A server includes a processor and a memory connected to the processor to store instructions executed by the processor to collect playback statistics from network connected content players, perform an evaluation of the playback statistics, and establish a playback configuration for specified content based upon the evaluation of the playback statistics. A request for the playback configuration for the specified content is received from a network connected content player. The playback configuration for the specified content is transferred to the network connected player.

A content player has a processor and a memory connected to the processor to store instructions executed by the processor to receive content over a network, play the content, and upload content statistics collected during playback to a server, where the content statistics characterize audio or video attributes of the content.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
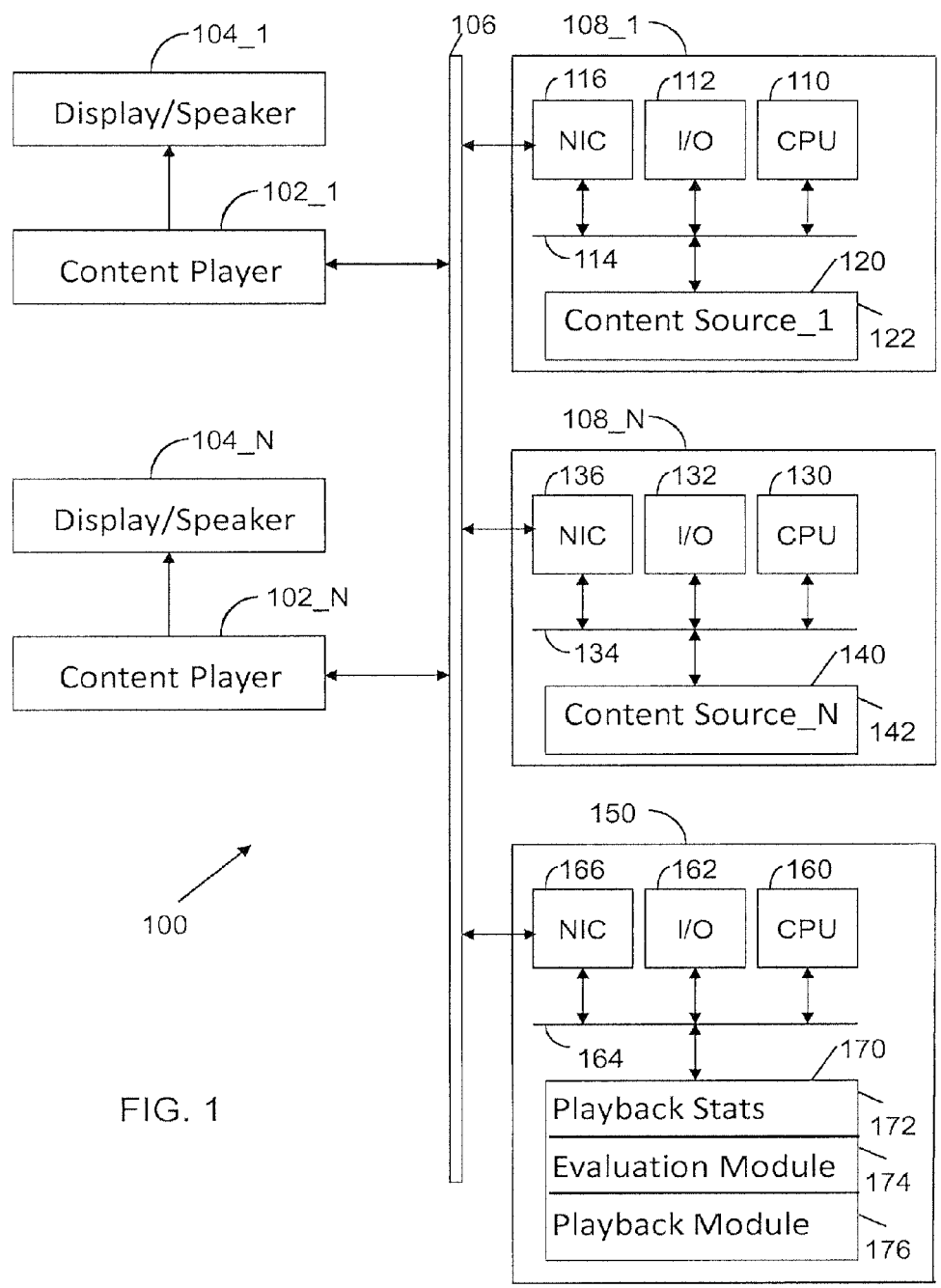
FIG. 1 illustrates a system configured in accordance with an embodiment of the invention.

FIG. 1 illustrates a system 100 configured in accordance with an embodiment of the invention. The system 100 includes a set of content players 102_1 through 102_N. Each content player may be a streaming media player, a game console, audio/video receiver and the like. Each content player 102 may have an associated display and speaker 104. For example, content player 102_1 may have associated display and speaker 104_1, while content player 102_N may have an associated display and speaker 104_N. Each content player 102 is connected to a network 106, which may be any combination of wired and/or wireless networks.

A set of content servers 108_1 through 108_N are connected to the network 106. Content server 108_1 includes standard components, such as a central processing unit 110 connected to input/output devices 112 via a bus 114. The input/output devices 112 may include a keyboard, mouse, display and the like. A network interface circuit 116 is also connected to the bus 114 to provide connectivity to network 106. A memory 120 is also connected to the bus 114. The memory 120 has an associated content source 122. The content source 122 may include individual instances of content, such as on-demand video, on-demand music, on-demand games and the like.

Similarly, server 108_N has standard components, such as a central processing unit 130, input/output devices 132, a bus 134, a network interface circuit 136 and a memory 140. Memory 140 has an associated content source 142. The content source 142 may include individual instances of content, such as on-demand video, on-demand music, on-demand games and the like. The content in content source 122 and content source 142 may be identical, may be completely different or may have some overlap.

A server 150 is also connected to network 106. The server 150 is configured as a content player master. That is, each content player 102 is configured to access and receive instructions from server 150.

The server 150 includes standard components, such as a central processing unit 160, input/output devices 162, a bus 164, a network interface circuit 166 and a memory 170. The memory 170 stores instructions executed by the central processing unit 160 to implement operations associated with an embodiment of the invention. In one embodiment, the memory 170 stores a set of playback statistics 172. The set of playback statistics 172 are collected from individual content players 102. In particular, a content player 102 plays a piece of content. The content player subsequently uploads playback statistics associated with the content to the content player master 150. The playback statistics characterize audio or video attributes of the content. The playback statistics from the different content players 102_1 through 102_N are aggregated to form playback statistics 172.

The memory 170 also includes an evaluation module 174. The evaluation module 174 includes instructions executed by the central processing unit 160 to evaluate the playback statistics 172. Consider the case of volume level statistics.

The playback statistics 172 may include N instances of volume level statistics for a single set of content. The single set of content may be identified using a uniform resource indicator. Such statistics may be aggregated to form a distribution of volume levels associated with the playback of the content. The evaluation module may 174 may identify a mean volume level and use that value as a playback configuration parameter for future instances in which the content is requested for playback. The playback configuration may have any number of parameters formed in this manner.

The playback configuration may be stored by the playback module 176. The playback module 176 stores a playback configuration for each identified content instance. When a specified instance of content is identified for playback on a content player 102, the content player 102 may fetch a playback configuration from the playback module 176. The playback module 176 transfers the playback configuration to the requesting content player 102. The requesting content player utilizes the playback configuration for the playback of the content.

Thus, the invention provides a system in which content players gather playback statistics which can be utilized to create a more uniform playback experience. Thus, crowd-sourcing is used to create a more uniform playback experience.

Figure 2:
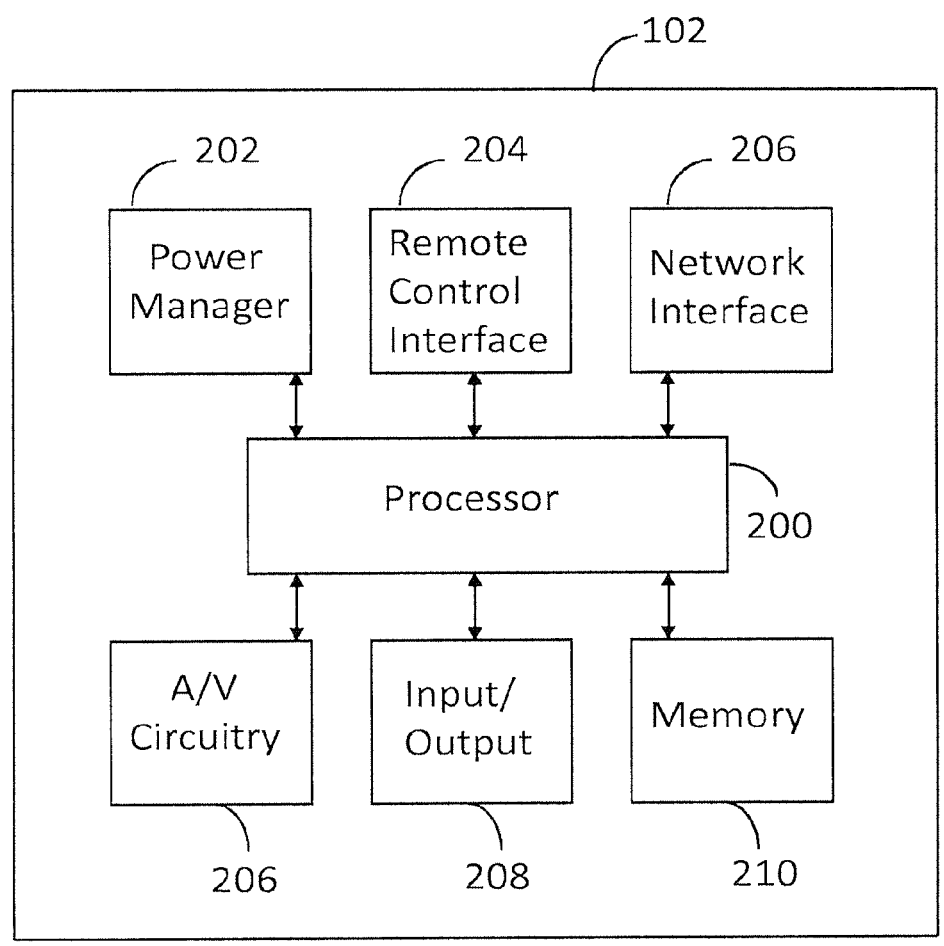
FIG. 2 illustrates a content player configured in accordance with an embodiment of the invention.

FIG. 2 provides an example configuration for a content player 102. In one embodiment, the content player 102 is configured to stream on-demand content into the device. The content streamed into the content player 102 may be audio content, visual content, applications and games. In one embodiment, the content player 102 is utilized to transmit instructions and selections to the server 150.

In one embodiment, the content player 102 includes a processor 200, power manager 202, remote control interface 204 and network interface 206. The content player 102 may also include audio/visual circuitry 206, input/output ports 208 and memory 210. Memory 201 stores instructions to upload playback statistics to server 150 and instructions to fetch playback configurations from server 150.

The processor 200 may utilize a central processing unit (CPU). In another embodiment, the processor 200 also utilizes a graphics processing unit (GPU), which may be integrated with the CPU or be configured to be physically separate. In one embodiment, the internal memory 210 includes one of or a combination of random access memory (RAM), flash memory, and read only memory (ROM). Additional memory and memory interfaces may be provided in various embodiments to support memories such as external storage, which may include hard disks, Universal Serial Bus (USB) drives, Secure Digital (SD) cards, and the like. These memories may also be used for storage of applications, programs, buffered media, media, executable computer code, and software keys.

The remote control interface 204 enables an input device (e.g., a web browser interface, a smartphone application or remote control) to interface with the content player 102. In one embodiment, the remote control interface 204 is configured to communicate with the input device through a wireless interface such as Bluetooth (BT), radio frequency (RF) and infrared (IR). In one embodiment, the remote control interface 204 supports the functionality through an input device including any combination of virtual buttons embodied on a customization screen, physical buttons, accelerometer, gyroscope, pressure sensor, tilt sensor, magnetic sensor, microphone, and light sensor.

In one embodiment, the I/O interface 208 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL), and composite video. In one embodiment, USB and Apple® Thunderbolt® enabled displays are also supported.

In one embodiment, network interface 206 supports multiple network interfaces such as Ethernet, Wi-Fi, and Bluetooth. In another embodiment, the network interface 206 also supports coaxial, digital TV antenna, and satellite television.

Figure 3:
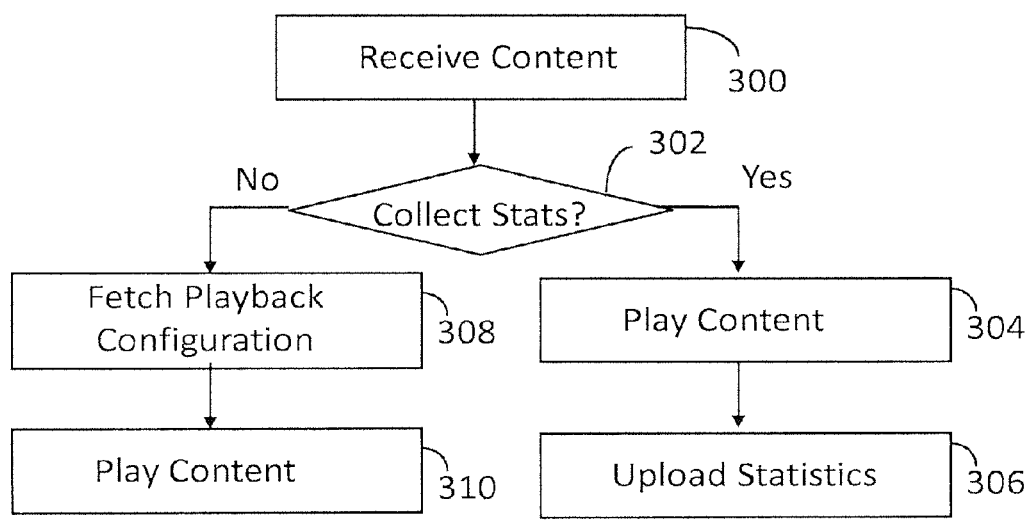
FIG. 3 illustrates processing operations associated with a content player configured in accordance with an embodiment of the invention.

FIG. 3 illustrates processing operations associated with an embodiment of the content player 102. Initially, a content player 102 receives content 300. The content is received over network 106 from any of the content servers 108_1 through 108_N.

The content player then asks server whether it should collect statistics 302. That is, instructions stored in memory 210 are executed by processor 200 to make a call to the content player master 150 through network interface circuit 206, which is connected to network 106. The content player master 150 may require that a certain number of initial statistics be available before a playback configuration may be specified. The content player master 150 may periodically want to update statistics even after a playback configuration is established. Thus, the collection of statistics need not be limited to the initial evaluation of new content.

If statistics are to be collected (302—Yes), the content player then plays the content 304. Typically, the content is compressed, in which case the content player decompresses the content during the playback process. Playback statistics are then uploaded 306. That is, the content player 102 uploads playback statistics to the content player master 150.

If statistics are not to be collected (302—No), then the playback configuration is fetched 308. The playback configuration specifies optimal settings for playback based upon collected statistics. The content is then played 310 in accordance with the playback configuration.

The aggregation of statistics may be done on a device-specified or a device-anonymous basis. For example, in the case of a known content player master server, device-specified data may be maintained. In an alternate embodiment, the content player master server may be an open source server that aggregates playback statistics on an anonymous basis.

As previously indicated, the playback statistics characterize audio or video attributes of the content. The audio attributes may be selected from volume level, peak volume, equalization, dynamic range, speaker configuration, room acoustics and codec used. The video attributes may be selected from video histogram, colorimetry information, scene changes detected, codec used, container format, raw video data and metadata.

Figure 4:
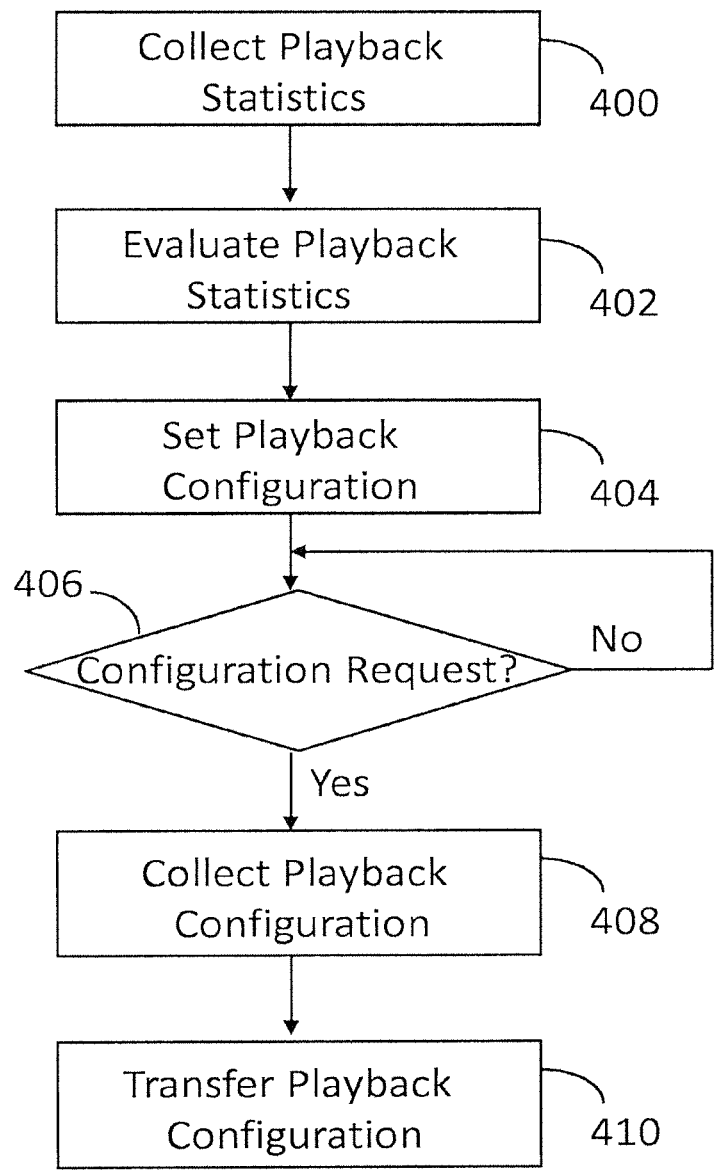
FIG. 4 illustrates processing operations associated with a server configured in accordance with an embodiment of the invention.

FIG. 4 illustrates processing operations associated with the content player master server 150. The server 150 collects playback statistics 400. This collection is performed via network 106. Content players 102_1 through 102_N may provide such statistics, as may other device connected to network 106. The collected playback statistics constitute playback statistics 172.

Next, playback statistics are evaluated 402. This operation may be performed by evaluation module 174, as discussed above. The evaluation process results in a playback configuration to equalize user experiences across content players for a specified instance of content. The server 150 may then service a configuration request 406. If such a request exists (406—Yes), a playback configuration is collected 408.

That is, a playback configuration is collected for specified content. The playback configuration is then transferred 410 to the requesting content player. The playback configuration may include playback configuration information for individual segments of the content and aggregated playback configuration information for the content. It should also be appreciated that the server may perform the operation of block 402 in response to a specific request. That is, playback statistics may be evaluated in response to a discrete query, not simply in connection with the collection of playback statistics.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a processor; and
a memory connected to the processor to store instructions executed by the processor to:
collect playback statistics from at least one of a plurality of devices, wherein the playback statistics comprise audio attributes or video attributes of playback of specified content;
perform an evaluation of the playback statistics;
establish a playback configuration for the specified content based upon the evaluation of the playback statistics;
receive, from a first device of the plurality of devices, a request for the playback configuration for the specified content; and
transfer the playback configuration for the specified content to the first device.

2. The server of claim 1, wherein the processor is further configured to re-evaluate the playback statistics at least once after the playback configuration has been established.

3. The server of claim 1, wherein the playback statistics are aggregated for a specified device type, wherein the specified device type is a category of playback devices to which the device belongs.

4. The server of claim 1, wherein the playback configuration includes playback configuration information for individual segments of the specified content or aggregated playback configuration information for the specified content.

5. The server of claim 1, wherein the evaluation is performed in response to (i) a specific request for the playback statistics or (ii) a discrete query for the playback statistics.

6. The server of claim 1, wherein the playback configuration is established after a predetermined number of initial statistics are available for evaluation.

7. The server of claim 1, wherein the processor is further configured to deliver streaming content to at least the first device of the plurality of devices, wherein the streaming content originates at a content source remote from the server.

8. The server of claim 7, wherein the content source comprises at least one instance of content, including at least one of on-demand video, on-demand music, or on-demand games.

9. A content player, comprising:
a processor; and
a memory connected to the processor to store instructions executed by the processor to:
receive content over a network;
receive, from a server, an indication to fetch a playback configuration, for at least one segment of the content, in response to a query from the content player of whether to collect statistics;
fetch the playback configuration, from at least one device of a plurality of devices comprising the server and at least one other content source; and
perform playback of the content in accordance with the playback configuration, wherein the playback configuration comprises settings of at least one of audio attributes or video attributes, customized for the content player, for the at least one segment of the content.

10. The content player of claim 9, wherein the audio attributes comprise at least one of volume level, peak volume, equalization, dynamic range, speaker configuration, room acoustics, or codec used.

11. The content player of claim 9, wherein the video attributes comprise at least one of video histogram, colorimetry information, scene changes detected, codec used, container format, raw video data, or metadata.

12. The content player of claim 9, wherein the playback configuration comprises separate playback configuration information for multiple segments of the content or aggregated playback configuration information for the content received over the network.

13. A method, comprising:
collecting playback statistics from at least one of a plurality of devices wherein the playback statistics comprise audio attributes or video attributes of playback of specified content;
performing an evaluation of the playback statistics;

establishing a playback configuration for the specified content based upon the evaluation of the playback statistics;

receiving, from a first device of the plurality of devices, a request for the playback configuration for the specified content; and transferring the playback configuration for the specified content to the first device.

14. The method of claim 13, further comprising:

re-evaluating the playback statistics at least once after the playback configuration has been established.

15. The method of claim 13, wherein the playback statistics are aggregated for a specified device type, wherein the specified device type is a category of playback devices to which the device belongs.

16. The method of claim 13, wherein the playback configuration includes playback configuration information for individual segments of the specified content or aggregated playback configuration information for the specified content.

17. The method of claim 13, wherein the evaluation is performed in response to (i) a specific request for the playback statistics or (ii) a discrete query for playback statistics.

18. The method of claim 13, wherein the establishing is performed after a predetermined number of initial statistics have become available for evaluation.

19. The method of claim 13, further comprising:

delivering streaming content to at least the first device of the plurality of devices, wherein the streaming content originates at a content source remote from a server.

20. The method of claim 19, wherein the content source comprises at least one instance of content, including at least one of on-demand video, on-demand music, or on-demand games.

* * * * *